United States Patent
Hu et al.

(10) Patent No.: US 8,462,452 B2
(45) Date of Patent: Jun. 11, 2013

(54) ELECTROMAGNETIC DRIVING DEVICE

(75) Inventors: Chao Chang Hu, Taoyuan County (TW); Chih Jumg Hung, Taoyuan County (TW)

(73) Assignee: TDK Taiwan Corp. (TW)

( * ) Notice: Subject to any disclaimer, the term of this patent is extended or adjusted under 35 U.S.C. 154(b) by 0 days.

(21) Appl. No.: 13/134,803

(22) Filed: Jun. 17, 2011

(65) Prior Publication Data
US 2012/0218650 A1 Aug. 30, 2012

(30) Foreign Application Priority Data
Feb. 24, 2011 (TW) .............................. 100106137 A

(51) Int. Cl.
*G02B 7/02* (2006.01)
*H02K 41/02* (2006.01)

(52) U.S. Cl.
USPC ........ 359/824; 359/814; 359/696; 310/12.04; 310/12.24

(58) Field of Classification Search
USPC ....... 359/814, 823, 824, 694, 696; 310/12.04, 310/12.16, 12.24, 12.32, 14, 15, 36; 369/44.14–44.16; 440/6, 17, 18; 417/354, 417/423.12, 423.1
See application file for complete search history.

(56) References Cited

U.S. PATENT DOCUMENTS

| | | | | |
|---|---|---|---|---|
| 7,394,603 B2 * | 7/2008 | Shiraki et al. | ................. | 359/819 |
| 7,400,068 B2 * | 7/2008 | Tseng | ......................... | 310/12.16 |
| 7,633,190 B2 * | 12/2009 | Liu et al. | ......................... | 310/15 |
| 7,800,985 B2 * | 9/2010 | Matozaki et al. | .......... | 369/44.16 |
| 8,040,621 B2 * | 10/2011 | Chang et al. | .................. | 359/824 |
| 2012/0026611 A1 * | 2/2012 | Hu et al. | ....................... | 359/824 |

\* cited by examiner

*Primary Examiner* — Loha Ben

(57) ABSTRACT

An electromagnetic driving device which is defined with an axis and comprises: a casing, a driven unit and an electromagnetic driving module. The casing has an inner compartment. The driven unit is received in the compartment and is guided by a guiding mechanism such that the driven unit is movable alone the axis inside the casing. The electromagnetic driving module comprises: a plurality of permanent magnets inside the casing, at least one magnetic member fixed to an outer surface of the driven unit, and a coil located between the magnetic member and permanent magnets. When no electric power is provided to the coil, the magnetic forcing between the permanent magnets and magnetic member will result in a friction force to the guiding mechanism, so as to keep the driven unit at its current position inside the compartment.

10 Claims, 5 Drawing Sheets

ELECTROMAGNETIC DRIVING DEVICE

BACKGROUND OF THE INVENTION

1. Field of the Invention

This invention relates to an electromagnetic driving device, and more particularly to the electromagnetic driving device that introduces a current magnetic field as a power source to drive an optical focus or zoom lens set, and whose lens set can be positioned by a friction induced by a field of magnets during a power-off state.

2. Description of the Prior Art

Referring to FIG. 1, an exploded view of a conventional focus lens set is shown. The focus lens set utilizes a mechanical focusing unit 9 including a hi-cost precision driving element 91 (for example, the step motor, the supersonic motor, the piezoelectric actuator, . . . , etc.) as the power source to drive the carrier 93 of the lens set 92, and many other transmission elements. Actually, such an arrangement in the conventional focus lens set, structural complication, assembly difficulty, cumbersome appearance and high cost are inevitable. Also, considerable energy consumption is another disadvantage for this type of lens sets. All of the foregoing features make the price of the aforesaid lens set irreducible.

In the early stage of the photography art, large human labor has been involved in metering, focusing and winding. Inevitably, it can be foreseen that how sorry would be if meeting a human mistake in taking photos in an important scene. Obviously, a quality photographer is the only answer to ensure photographing during such an important scene. Yet, it is well known that no 100% photographer is available anywhere and anytime. In the 50's and 60's, a great step has been achieved in the mechanical automation, from which people believe that automation would be the key to the future world. At that time, in the photography art, various developments such as the auto-metering device, the electrical winding apparatus and so on, have convinced people that automation is the future to the photography art. Among these developments, the development in the automatic focusing system who ensures the possibility of rapid photo-taking plays an important part.

Along with the technology development, conventional photographic apparatus has been progressed both in photographing quality and in the miniaturized appearance. However, the mechanical focusing lens set driven by the step motor hinders a further reduction in occupation of the apparatus On the other hand, electromagnetic technology has also been introduced to improve the VCM electronic feedback system in monitoring the bias of the coil, which can replace the conventional step motor and provide a size down in the driving mechanism. Another development of the photography art is to add the photographic function to the other apparatus; for example, the integration of the photographic unit to the mobile phone, the PDA, the notebook computer and so on. All these changes make the current electronic merchandises equipped with a photographic unit that enhances a powerful video application to these aforesaid apparatuses.

Nevertheless, the aforesaid mobile phone, PDA, notebook computer, and the like portable electronic apparatus all have limitations in the battery capacity. Therefore, in aiming at the future of the photography art, the devotion upon how to design a low-energy-consumed driving device for focus or zoom lens set and how to anchor the lens set while the power is off is definitely welcome to the skilled person in the art.

SUMMARY OF INVENTION

Accordingly, it is a primary object of the present invention to provide an electromagnetic driving device that utilizes a magnetic force to induce a friction force for further hold still a lens module while the power is off, such that a purpose of saving the energy can be achieved.

The electromagnetic driving device according to the present invention defines a center axis and comprises a casing, a driven unit and an electromagnetic driving module. The casing is a hollow housing having an inner compartment. The driven unit accommodated in the inner compartment can be a lens module and moved along the center axis inside the casing by a guiding mechanism. The electromagnetic driving module is located inside the inner compartment at a position respective to the lens module.

The electromagnetic driving module further includes a plurality of permanent magnets, at least a magnetic member and a coil located between the magnetic member and the permanent magnets. The magnetic member is mounted at the lens module. One of the permanent magnets is positioned to face the magnetic member. In the present invention, while a current is terminated to the coil, a friction force at the friction part of the guiding mechanism which is induced from forcing between the permanent magnets and the magnetic member can be generated to hold still the lens module inside the inner compartment.

All these objects are achieved by the electromagnetic driving device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an electromagnetic driving device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
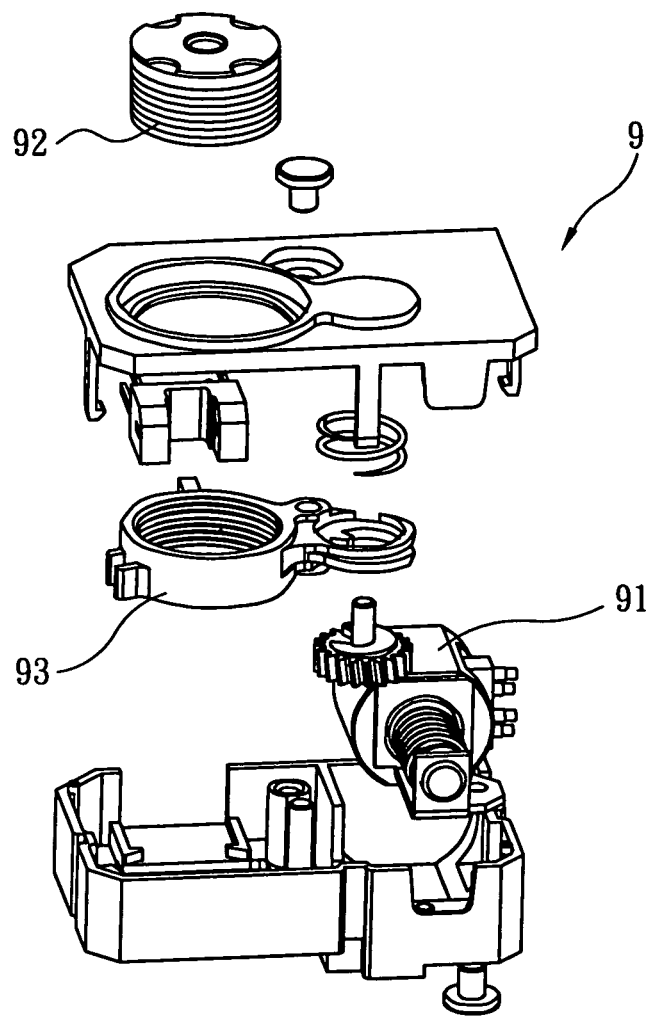
FIG. 1 is an exploded view of a conventional focus lens set.
Figure 2:
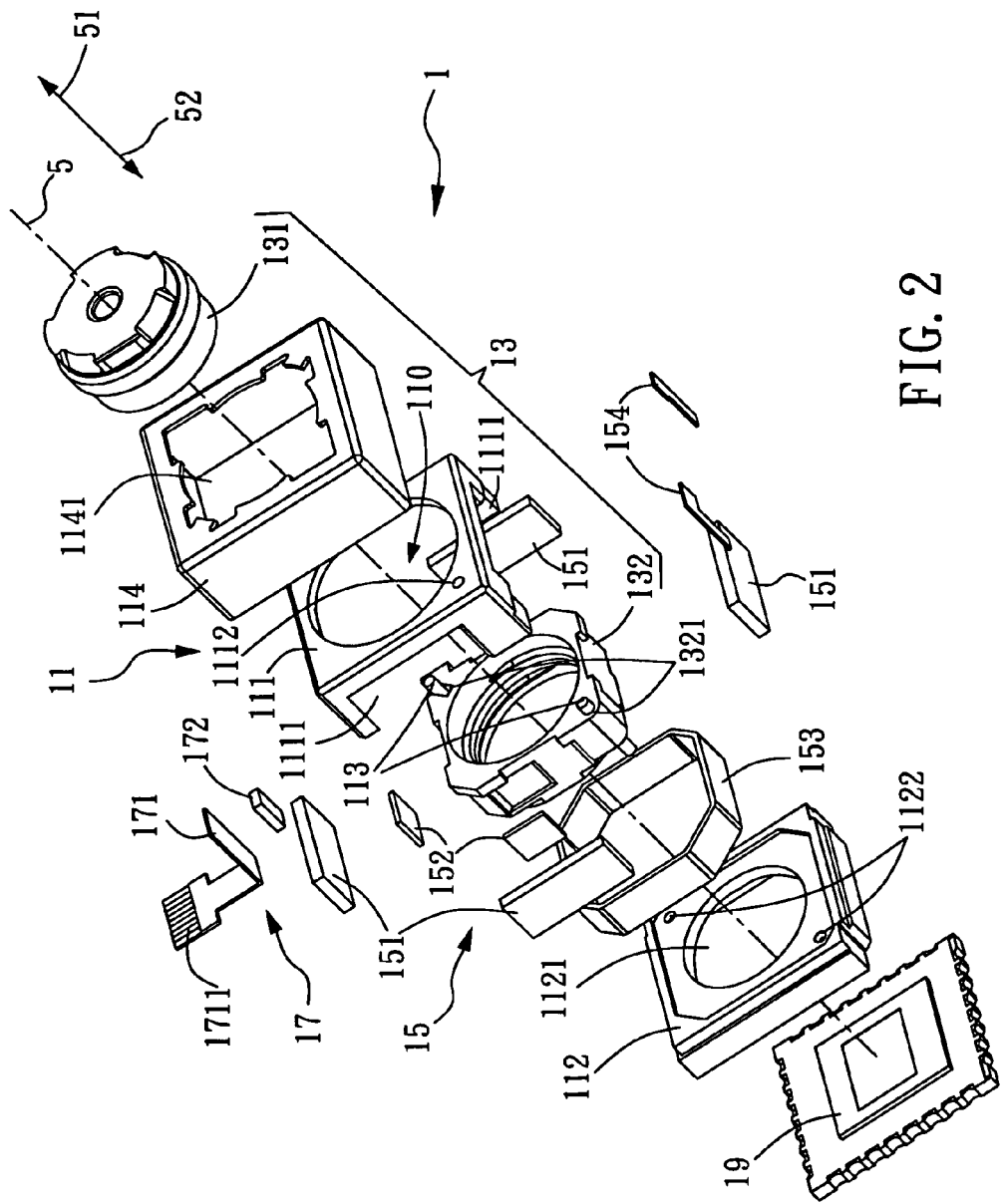
FIG. 2 is an exploded view of a preferred electromagnetic driving device in accordance with the present invention.
Figure 3:
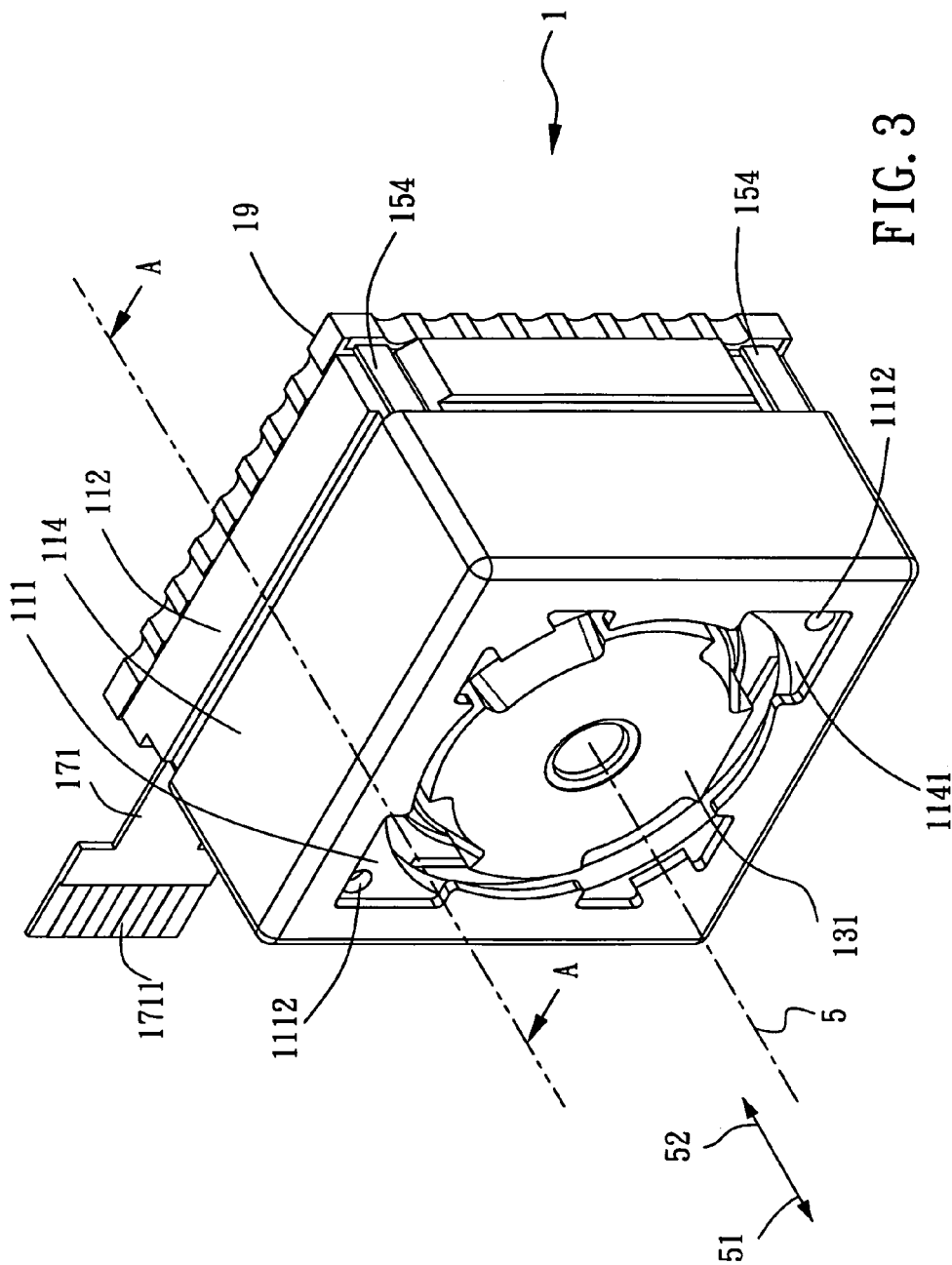
FIG. 3 a perspective view of the assembly of FIG. 2.
Figure 4:
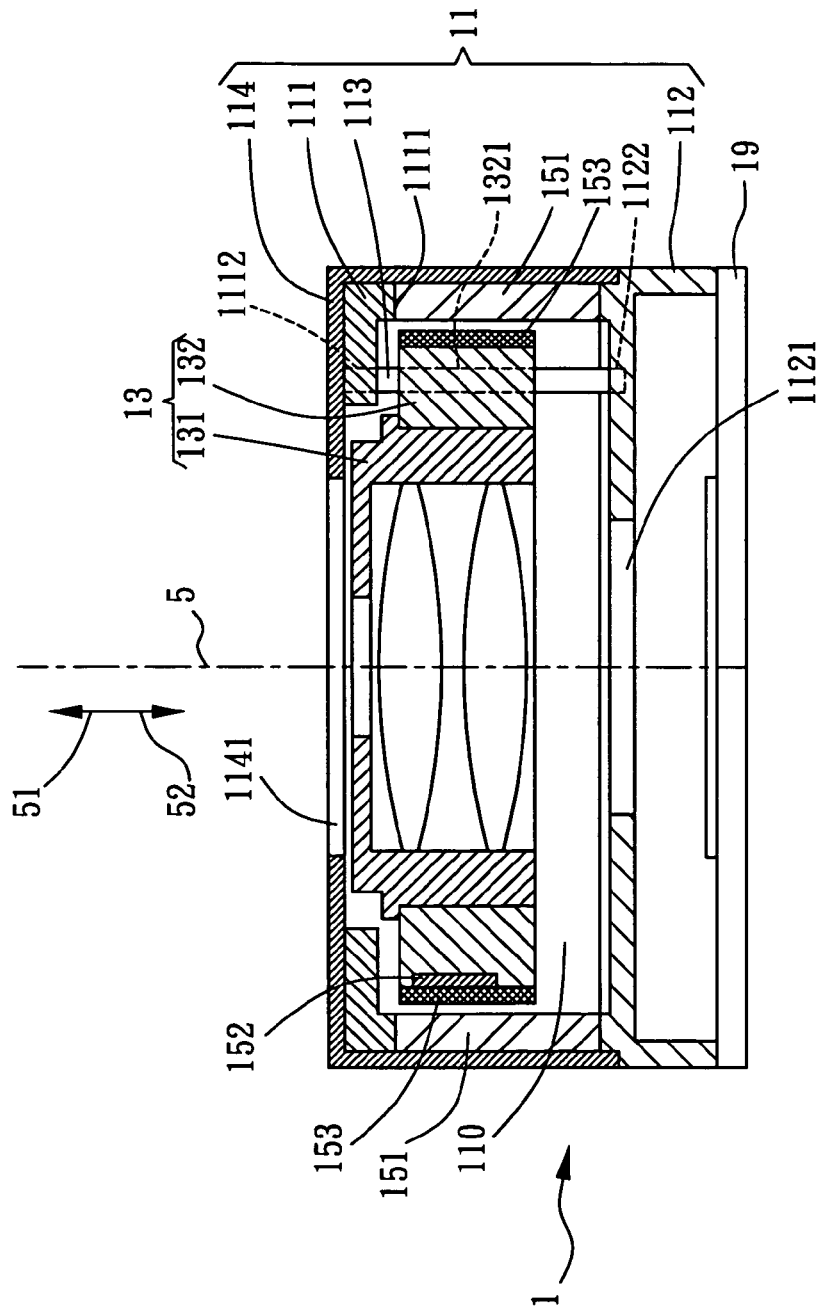
FIG. 4 is a cross-sectional view along line A-A of FIG. 3.

Referring now to FIG. 2, FIG. 3 and FIG. 4, an exploded view, a perspective view and a specific cross-sectional view along line A-A of FIG. 3 of a preferred electromagnetic driving device 1 in accordance with the present invention are shown, respectively.

As shown, the electromagnetic driving device 1, defined along a center axis 5, includes a casing 11, a driven unit (preferably, a lens module 13), an electromagnetic driving module 15, a position-sensing module 17 and an image-sensing module 19. The center axis 5 defines a front direction 51 and a rear direction 52. The casing 11 further includes an upper cover 111, a lower cover 112 and at least a guiding mechanism 113 and a skin shield 114. In this embodiment, the driven unit can be a lens module 13 further including a lens set 131 and a lens carrier 132. In the other embodiments not shown herein, the driven unit can be an object that is linearly moved within the casing 11. The electromagnetic driving module 15 further includes a plurality of permanent magnets 151, at least a magnetic member 152, a coil 153 and two coil terminals 154. The position-sensing module 17 further includes a position-sensing terminal 171 and a position sensor 172.

The upper cover 111 is a hollow top structure. The skin shield 114 to provide housing between the upper cover 111 and the lower cover 112 is a hollow shell structure having a central penetration hole 1141. While the upper cover 111 engages with the lower cover 112, an inner compartment 110 is formed to accommodate thereinside the lens module 13. As shown, a plurality of receiving slots 1111 for nesting respective permanent magnets 151 is included peripherally to the upper cover 111. The permanent magnets 151 are further positioned by the skin shield 114 between the upper cover 111 and the lower cover 112. The lens module 13 inside the inner compartment 110 is to capture the external image through the penetration hole 1141.

In the preferred embodiment as shown herein, four permanent magnets 151 and two magnetic members 152 are included. Also, four receiving slots 1111 for receiving respective permanent magnets 151 are located at four lateral sides of the upper cover 111 and are further restrained by the skin shield 114. The magnetic members 152 are mounted to respective sides of the lens carrier 132, and each of which is to pair with a respective permanent magnet 151. In this embodiment, the magnetic member 152 is made of yoke iron in a thin plate form. As shown, the two magnetic members 152 are located respectively to two neighboring lateral sides of the lens carrier 132.

The lens module 13 is located inside the inner compartment 110 in a manner of a center line of the lens module 13 being hold on and moved linearly along the center axis 5 by the guiding mechanism 13. No rotation is allowed to the lens module 13. The lens set 131 is mounted in a center of the lens carrier 132, and is synchronically moved with the lens carrier 132. Between the upper cover 111 and the lower cover 112, the guiding mechanism 113 is extended therebetween and engaged therewith to provide the lens module 13 linear motion guiding along the center axis 5 inside the inner compartment 110. The image-sensing module 19 is engaged behind the lower cover 112 and looks at the lens module 13 in the inner compartment 110 through a center penetration empty 1121 at the lower cover 112. Both the image-sensing module 19 and the lens module are located at the center axis 5. The image-sensing module 19 captures images of foreign objects through the penetration hole 1141 of the skin shield 114. In the present invention, the guiding mechanism 113 can be preferably embodied as a pair of a slim long rod and a corresponding penetration hole or a pair of an extended rack and a corresponding guiding slot.

Figure 5:
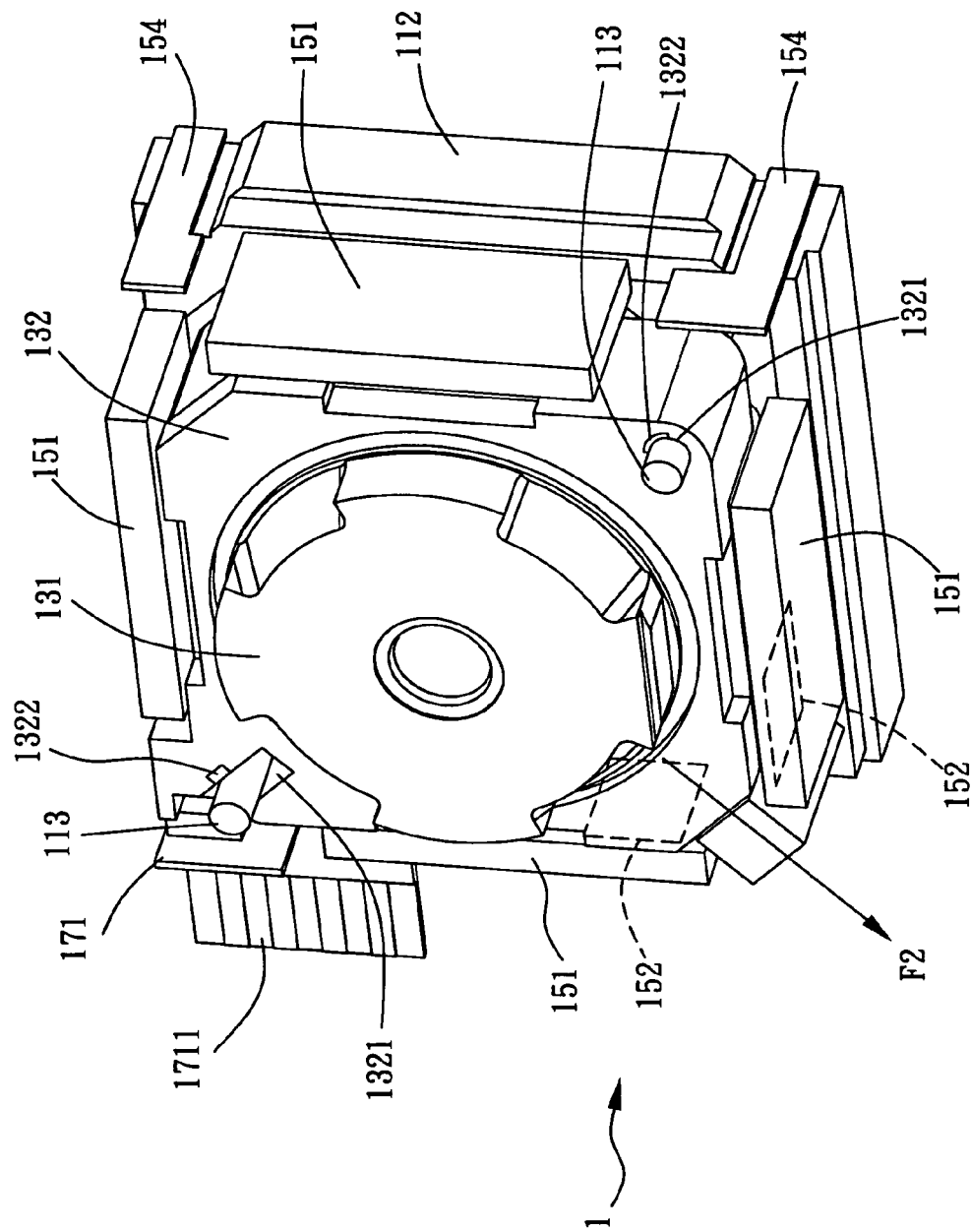
FIG. 5 is a perspective view of FIG. 3 by removing the casing and the coil.

As shown in FIG. 2, the guiding mechanism 113 includes two guiding rods (labeled as the same 113 in the following description) engaging the corresponding guiding holes 1321 (or slots) located to opposing sides of the lens module 13. Further, corresponding friction parts 1322 (as shown in FIG. 5) are located on the lens module 13 to pair the guiding holes or slots 1321. The friction part 1322 is to provide relevant friction to the contacting guiding rod 113. The magnitude of the friction is dependent on the material and/or the size of the friction part 1322. In addition, one end (the upper end) of the guiding rod 113 is fastened to a position terminal 1112 of the upper cover 111, while another end (the lower end) of the guiding rod 113 is fastened to an engagement terminal 1122 of the lower cover 112. Upon such an arrangement, two guiding rods 113 can be formed as two axial racks parallel to the center axis 5 inside the inner compartment 110 to mount and slide therealong the lens module 13 via the two guiding holes or slots 1321. The lens module 13 can be driven by the electromagnetic driving module 15 to slide linearly back and forth along the center axis 5, and no rotation is allowed to the lens module 13.

The coil 153 surrounding the lens module 13 inside the inner compartment 122 is located between the permanent magnets 151 and the magnetic members 152. By providing predetermined currents with specific phases to cross two terminals 154 of the coil 153 so as to induce corresponding magnetic fields with different directions, the lens carrier 132 in the inner compartment 110 can be driven either forward 51 or backward 52 along the center axis 5. Thereby, focusing or zooming operation between the lens set 131 and the image-sensing module 19 engaged to rear of the lower cover 112 can be achieved.

In this embodiment of the present invention, the coil 153 is electrically connected with the two coil terminals 154 located at the outsides of the lower cover 112. It is defined that the electromagnetic force F1 is the force to drive the lens module 13 upward after a specific current is applied through the two coil terminals 154, the magnetic force F2 is the resultant force induced from the magnetic members 152 and the permanent magnets 151, and the force F3 is the weight of the lens module 13. As shown in FIG. 5, when two magnetic members 152 are included and located at two sides of the lens carrier 132 neighboring to the same corner thereof, the resultant magnetic force F2 from the permanent magnets 151 and the two magnetic members 152 would be the force shown in FIG. 5 that pulls the lens carrier 132 outwards along a diagonal direction. Accordingly, the force F2 would induce a relevant friction force F4 between the guiding rods 113 of the guiding mechanism and the corresponding friction parts 1322. The magnitude of F4 is determined by the material and/or the size of the friction part 1322 and also by changing the F2.

When the power on the coil 153 is removed, in order to hold still the position of the lens module 13, the friction force F4 between the guiding rods 113 and the corresponding friction parts 1322 must be greater than the weight F3 of the lens module 13; i.e., F4>F3. On the other hand, in order to move the lens module 13 after the coil 153 is charged, the electromagnetic force F1 to drive the lens module 13 must be greater than the sum of the friction force F4 and the weight F3 of the lens module 13; i.e., F1>F4+F3. It is noted that the F1 can be changed by altering the magnetic of the permanent magnets 151 or the coil number of the coil 153, and the F2 can be altered by changing the magnetic of the permanent magnets 151 and/or the action area of the magnetic member 152. Such that states of F4>F3 and F1>F4+F3 can be obtained.

Namely, the electromagnetic driving device 1 of the present invention is to control the electromagnetic force F1 by altering the current input to the coil terminals 154 of the coil 153. The lens carrier 132 in the inner compartment 110 can be also moved axially along a specific direction due to the change in the current magnetic field of the coil 153. When the F1 is greater than the sum of F4 and F3 (F1>F4+F3), the lens module 13 is driven by F1 and guided by the guiding mechanism 113 to perform forward 51 and backward 52 motion along the center axis 5 so as to process focusing or zooming operation.

However, in the case that the current input to the coil 153 is removed, the electromagnetic force F1 would be dead. At this time of terminating the action of the coil 153, the friction force F4 between the guiding rods 113 and the friction parts 1322 would be greater than the weight F3 of the lens module 13 (F4>F3), such that the lens module 13 can be held still by the F4 and thus energy for further moving the lens module 13 can be avoided.

In the present invention, the position-sensing module 17 is to detect and calculate the relative position between the lens module 13 and the casing 11. The position-sensing terminal 171 for detecting the displacement of the lens module 13 in the inner compartment 110 of the casing 11 is mounted on the upper cover 111 at a position facing to the position sensor 172 located at the exterior of the lens module 13. The position-sensing terminal 171 further has a plurality of metal leads 1711 for connection with the foreign circuitry.

While the present invention has been particularly shown and described with reference to a preferred embodiment, it will be understood by those skilled in the art that various changes in form and detail may be without departing from the spirit and scope of the present invention.

What is claimed is:

1. An electromagnetic driving device, defining a center axis, comprising:
   a casing, having an inner compartment;
   a driven unit, accommodated in the inner compartment and moved along the center axis inside the casing, further having at least a friction part;
   an electromagnetic driving module, located inside the inner compartment at a position facing the driven unit, the module including a plurality of permanent magnets, at least one magnetic member and a coil, the magnetic member being mounted on the driven unit, one of the permanent magnets being positioned to face the magnetic member, the coil being mounted to surround the driven unit and located between the magnetic member and the permanent magnets; and
   a guiding mechanism, connected with the driven unit for guiding the driven unit to move along the center axis, the guiding mechanism contacting the friction part;
   wherein a friction force to hold still the driven unit, while a current is terminated to the coil, is generated at the friction part, during said contact, from a magnetic force of the one of the permanent magnets on the magnetic member.

2. The electromagnetic driving device according to claim 1, wherein said driven unit is a lens module, defining an F1 as an electromagnetic force of said coil to drive the lens module, defining an F2 as a magnetic force between said permanent magnets and said magnetic member, defining an F3 as a weight of the lens module, defining an F4 as said friction force, in which F4>F3 and F1>F4+F3.

3. The electromagnetic driving device according to claim 1, wherein said magnetic member is made of a yoke iron.

4. The electromagnetic driving device according to claim 2, wherein said lens module further includes a lens set and a lens carrier, the lens set being located at a center portion of the lens carrier and moved synchronically with the lens carrier.

5. The electromagnetic driving device according to claim 4, wherein said casing further includes an upper cover, a lower cover, at least the guiding mechanism and a skin shield, the guiding mechanism being located between the upper cover and the lower cover for providing guiding of a linear motion along said center axis inside said inner compartment to said lens module, the skin shield located between the upper cover and the lower cover and being to position said permanent magnets.

6. The electromagnetic driving device according to claim 5, further including an image-sensing module engaged to a rear of said lower cover and looking at said lens module through a center penetration of said lower cover, the image-sensing module and said lens module being centered at said center axis.

7. The electromagnetic driving device according to claim 5, wherein said guiding mechanism includes an element selected from the group consisting of a guiding rod and a guiding rack.

8. The electromagnetic driving device according to claim 5, wherein said permanent magnets are four permanent magnets nested in respective receiving slots formed at four lateral sides of said upper cover, said at least one magnetic member is two magnetic members located at corresponding sides of said lens carrier by neighboring to a same corner of said lens carrier, each of the magnetic members being positioned to face one of said permanent magnets.

9. The electromagnetic driving device according to claim 5, further including a position-sensing module having a position-sensing terminal and a position sensor, wherein the position-sensing terminal is mounted on said upper cover at a position facing to the position sensor located at an exterior of said lens module.

10. The electromagnetic driving device according to claim 5, further including two coil terminals mounted exteriorly to said upper cover and connected electrically with said coil, the coil terminals applying said current to said coil.

* * * * *